US010999209B2

(12) United States Patent
Browne et al.

(10) Patent No.: US 10,999,209 B2
(45) Date of Patent: May 4, 2021

(54) TECHNOLOGIES FOR SCALABLE NETWORK PACKET PROCESSING WITH LOCK-FREE RINGS

(71) Applicant: Intel Corporation, Santa Clara, CA (US)

(72) Inventors: John J. Browne, Limerick (IE); Tomasz Kantecki, Ennis (IE); Chris Macnamara, Limerick (IE); Pierre Laurent, Quin (IE); Sean Harte, Limerick (IE); Peter McCarthy, Ennis (IE); Jacqueline F. Jardim, Sixmilebridge (IE); Liang Ma, Shannon (IE)

(73) Assignee: Intel Corporation, Santa Clara, CA (US)

( * ) Notice: Subject to any disclaimer, the term of this patent is extended or adjusted under 35 U.S.C. 154(b) by 669 days.

(21) Appl. No.: 15/635,581

(22) Filed: Jun. 28, 2017

(65) Prior Publication Data

US 2019/0007330 A1 Jan. 3, 2019

(51) Int. Cl.
*H04L 12/873* (2013.01)
*H04L 12/883* (2013.01)
(Continued)

(52) U.S. Cl.
CPC ............ *H04L 47/522* (2013.01); *H04L 47/60* (2013.01); *H04L 47/6215* (2013.01);
(Continued)

(58) Field of Classification Search
CPC ... H04L 47/522; H04L 47/60; H04L 47/6215; H04L 47/805; H04L 49/9015; H04L 49/9026
See application file for complete search history.

(56) References Cited

U.S. PATENT DOCUMENTS 6,047,118 A 4/2000 Sofman et al.
7,313,098 B2 12/2007 Bearden et al.
(Continued)

FOREIGN PATENT DOCUMENTS

EP 0775958 A1 5/1997

OTHER PUBLICATIONS

Advisory Action for U.S. Appl. No. 15/185,864, dated May 1, 2019, 2 pages.
(Continued)

*Primary Examiner* — Eric Myers
(74) *Attorney, Agent, or Firm* — Compass IP Law PC

(57) ABSTRACT

Technologies for network packet processing include a computing device that receives incoming network packets. The computing device adds the incoming network packets to an input lockless shared ring, and then classifies the network packets. After classification, the computing device adds the network packets to multiple lockless shared traffic class rings, with each ring associated with a traffic class and output port. The computing device may allocate bandwidth between network packets active during a scheduling quantum in the traffic class rings associated with an output port, schedule the network packets in the traffic class rings for transmission, and then transmit the network packets in response to scheduling. The computing device may perform traffic class separation in parallel with bandwidth allocation and traffic scheduling. In some embodiments, the computing device may perform bandwidth allocation and/or traffic scheduling on each traffic class ring in parallel. Other embodiments are described and claimed.

28 Claims, 6 Drawing Sheets

(51) Int. Cl.
*H04L 12/879* (2013.01)
*H04L 12/927* (2013.01)
*H04L 12/863* (2013.01)
*H04L 12/869* (2013.01)

(52) U.S. Cl.
CPC ........ *H04L 47/805* (2013.01); *H04L 49/9015* (2013.01); *H04L 49/9026* (2013.01)

(56) References Cited

U.S. PATENT DOCUMENTS

| | | |
|---|---|---|
| 7,571,216 B1 | 8/2009 | McRae et al. |
| 10,341,264 B2 | 7/2019 | Browne et al. |
| 10,411,985 B1 | 9/2019 | Miller et al. |
| 2006/0174251 A1 | 8/2006 | Pope et al. |
| 2008/0028103 A1 | 1/2008 | Schlansker et al. |
| 2008/0056124 A1 | 3/2008 | Nanda et al. |
| 2008/0151765 A1 | 6/2008 | Cheruvathery |
| 2008/0209420 A1 | 8/2008 | Matsuo |
| 2012/0191800 A1 | 7/2012 | Michels et al. |
| 2013/0054938 A1 | 2/2013 | Giacomoni et al. |
| 2013/0173806 A1 | 7/2013 | Newton et al. |
| 2013/0179753 A1 | 7/2013 | Flynn et al. |
| 2013/0232137 A1 | 9/2013 | Knott |
| 2014/0032695 A1 | 1/2014 | Michels et al. |
| 2014/0143366 A1 | 5/2014 | Thakkar |
| 2014/0149993 A1 | 5/2014 | Sandstrom |
| 2015/0082319 A1* | 3/2015 | Liu .................. H04L 47/52 718/107 |
| 2015/0172193 A1 | 6/2015 | Sinha et al. |
| 2015/0331720 A1* | 11/2015 | Huetter ............. G06F 9/5016 718/104 |
| 2016/0044695 A1* | 2/2016 | Gunner ............ H04L 49/90 370/336 |
| 2016/0246472 A1 | 8/2016 | Zhao |
| 2017/0366477 A1 | 12/2017 | Browne et al. |
| 2019/0327190 A1 | 10/2019 | Browne et al. |

OTHER PUBLICATIONS

First Office Action for U.S. Appl. No. 15/199,110, dated Oct. 26, 2018, 13 pages.
First Final Office Action for U.S. Appl. No. 15/185,864, dated Nov. 19, 2018, 14 pages.
First Office Action for U.S. Appl. No. 15/185,864, dated Apr. 26, 2018, 18 pages.
First Office Action for U.S. Appl. No. 15/199,110, dated Mar. 29, 2018, 15 pages.
International Search Report and Written Opinion for PCT Patent Application No. PCT/US17/35205, dated Sep. 11, 2017, 10 pages.
International Search Report and Written Opinion for PCT Patent Application No. PCT/2017/033279, dated Aug. 17, 2017, 12 pages.
Second Advisory Action for U.S. Appl. No. 15/185,864, dated Aug. 3, 2020, 3 pages.
Second Final Office Action for U.S. Appl. No. 15/185,864, dated May 13, 2020, 37 pages.
Second Office Action for U.S. Appl. No. 15/185,864, dated Sep. 12, 2019, 23 pages.
Third Office Action for U.S. Appl. No. 15/185,864, dated Oct. 2, 2020, 27 pages.

* cited by examiner

TECHNOLOGIES FOR SCALABLE NETWORK PACKET PROCESSING WITH LOCK-FREE RINGS

BACKGROUND

Increasingly, network functions traditionally performed by dedicated hardware devices are being performed using general-purpose computers, such as server computers that include one or more Intel® Xeon® processors. For example, network functions such as routing, packet filtering, caching, and other network functions may be executed by a virtualization platform, which may include any combination of network function virtualization (NFV), software-defined networking (SDN), and/or software-defined infrastructure (SDI).

Carriers may use hierarchical quality of service (HQoS) to consolidate different services on the same physical device running on the same physical infrastructure. Using HQoS, a carrier may implement a service level agreement and prioritize traffic per server per Ethernet port. Typical HQoS scheduling includes multiple instances of scheduling and traffic shaping and may include processing packet data through multiple intermediate queues or other buffers (e.g., removing packet data from a queue, adding the packet data to an intermediate queue, and so on).

One technique for establishing lockless shared ring buffers (or rings) are described in U.S. patent application Ser. No. 15/199,110, filed on Jun. 30, 2016. A shared ring includes multiple ring slots that include ring slot metadata. Multiple processing stages may access such a shared ring concurrently, without the use of locks or other concurrency control techniques, because each stage owns and may write particular metadata fields that are not writable by the other stages. Each stage also maintains its own internal sequence number that is used to determine whether particular ring slots have been processed by that stage. Ring-full and ring-empty conditions may be determined by comparing the sequence numbers of input and output stages.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
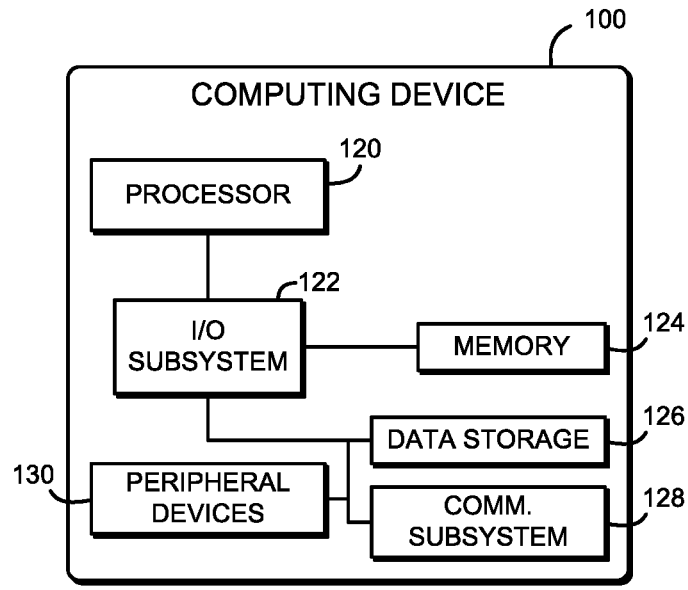
FIG. 1 is a simplified block diagram of at least one embodiment of a computing device for scalable network packet processing.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a computing device 100 for scalable network packet processing is shown. In use, as described further below, the computing device 100 places incoming network packets into a shared lockless input ring. The computing device 100 classifies the incoming network packets, for example by traffic class and output port, and places the packets into a corresponding lockless, shared traffic class ring. The computing device 100 then performs quality of service processing and transmission scheduling on the traffic class rings. The computing device 100 may continue to receive and classify incoming network packets in parallel with the quality of service processing and output scheduling. The computing device 100 enforces packet order within flows and prevents packets from going out of order, without using per-flow packet queues. Thus, the computing device 100 may perform sophisticated packet processing including quality of service processing without intermediate queuing and/or buffering. Accordingly, the computing device 100 may improve packet processing latency as compared to hierarchical quality of service (HQoS) processing with intermediate queuing. Additionally, the computing device 100 may allow for traffic classification in parallel with bandwidth allocation and scheduling of packets, thus improving the scalability of packet processing with the number of processor cores. Further, because the computing device 100 does not rely on FIFO queues, multiple schedulers may operate on packets in the same shared ring in parallel, also improving parallel scalability.

The computing device 100 may be embodied as any type of computation or computer device capable of performing the functions described herein, including, without limitation, a computer, a server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 100 illustratively include a processor 120, an input/output subsystem 122, a memory 124, a data storage device 126, and a communication subsystem 128, and/or other components and devices commonly found in a server computer or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 100, such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 100. For example, the I/O subsystem 122 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 100, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The communication subsystem 128 of the computing device 100 may be embodied as any communication circuit, device, or collection thereof, capable of enabling communications between the computing device 100 and other remote devices over a network. The communication subsystem 128 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 130. The peripheral devices 130 may include any number of additional input/output devices, interface devices, and/or other peripheral devices. For example, in some embodiments, the peripheral devices 130 may include a display, touch screen, graphics circuitry, keyboard, mouse, speaker system, microphone, network interface, and/or other input/output devices, interface devices, and/or peripheral devices.

Figure 2:
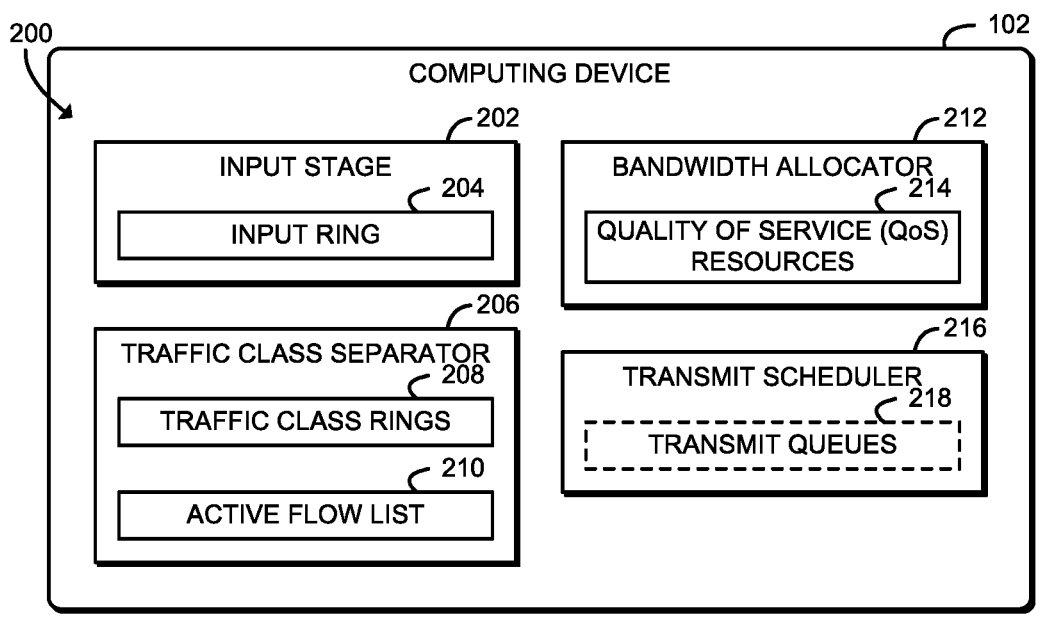
FIG. 2 is a simplified block diagram of at least one embodiment of an environment that may be established by the computing device of FIG. 1.

Referring now to FIG. 2, in an illustrative embodiment, the computing device 100 establishes an environment 200 during operation. The illustrative environment 200 includes an input stage 202, a traffic class separator 206, a bandwidth allocator 212, and a transmit scheduler 216. The various components of the environment 200 may be embodied as hardware, firmware, software, or a combination thereof. As such, in some embodiments, one or more of the components of the environment 200 may be embodied as circuitry or collection of electrical devices (e.g., input stage circuitry 202, traffic class separator circuitry 206, bandwidth allocator circuitry 212, and/or transmit scheduler circuitry 216). It should be appreciated that, in such embodiments, one or more of the input stage circuitry 202, the traffic class separator circuitry 206, the bandwidth allocator circuitry 212, and/or the transmit scheduler circuitry 216 may form a portion of one or more of the processor 120, the I/O subsystem 122, the communication subsystem 128, and/or other components of the computing device 100. Additionally, in some embodiments, one or more of the illustrative components may form a portion of another component and/or one or more of the illustrative components may be independent of one another.

The input stage 202 is configured to add incoming network packets to an input lockless shared ring 204. Each network packet may be embodied as a data link layer packet, an Ethernet frame, or other network packet received by an input port of the communication subsystem 128. Adding the incoming network packets may include adding ring slot metadata associated with the incoming network packets to the input lockless shared ring 204. The input ring 204 may be embodied as a ring buffer or other data structure in the memory 124 of the computing device 100. Each entry or slot in the input ring 204 may include ring slot metadata that may be accessed based on agreed rules by consumers to avoid locking. The ring slot metadata may include, for example, a pointer or other reference to a data buffer that includes the associated network packet, an output port for the associated network packet, a quality of service resource associated with the network packet, a scheduled status field, a dropped status field, a transmit flag, or other metadata. In some embodiments, the input ring 204 may be embodied as a lockless, shared ring as described in U.S. patent application Ser. No. 15/199,110, filed on Jun. 30, 2016.

The traffic class separator 206 is configured to add the incoming network packets to multiple lockless shared traffic class rings 208 in response to adding the network packets to the input lockless shared ring 204. Similar to the input ring 204, each traffic class ring 208 may be embodied as a ring buffer or other data structure in the memory 124 of the computing device 100, and may be embodied as a lockless, shared ring as described in U.S. patent application Ser. No. 15/199,110, filed on Jun. 30, 2016. Each lockless shared traffic class ring 208 is associated with an output port and a traffic class, and in some embodiments may also be associated with a logical group. Adding a network packet to a lockless shared traffic class ring 208 may include adding a reference to the ring slot metadata associated with the network packet in the input lockless shared ring 204. The traffic class separator 206 may also add flow data to an active flow list 210 for each of the incoming network packets.

The bandwidth allocator 212 is configured to allocate bandwidth to the network packets in the lockless shared traffic class rings 208 that are active in a particular scheduling quantum. As described above, the ring slot metadata associated with each data packet may point to or otherwise reference a quality of service (QoS) resource 214. A QoS resource 214 may be associated with each flow in the active flow list 210. Allocating bandwidth to the network packets may include updating the QoS resource 214 associated with each of the network packets. In some embodiments, the bandwidth allocator 212 may be configured to allocate bandwidth to network packets in one or more logical groups of lockless shared traffic class rings 208.

The transmit scheduler 216 is configured to schedule network packets in the lockless shared traffic class rings 208 for transmission. Each of the network packets is included in a particular scheduling quantum. The transmit scheduler 216 may schedule the network packets in response to bandwidth allocation. The transmit scheduler 216 is further configured to transmit the network packets in response to scheduling of the network packets for transmission. In some embodiments, the network packets may be added to one or more transmit queues 218 for transmission. Similar to the input ring 204 and the traffic class rings 208, each transmit queue 218 may also be embodied as a lockless, shared ring. As described further below, the transmit scheduler 216 and the bandwidth allocator 212 may execute in parallel with the input stage 202 and the traffic class separator 206. Further, in some embodiments, the network packets in each lockless shared traffic class ring 208 may be scheduled in parallel.

Figure 3:
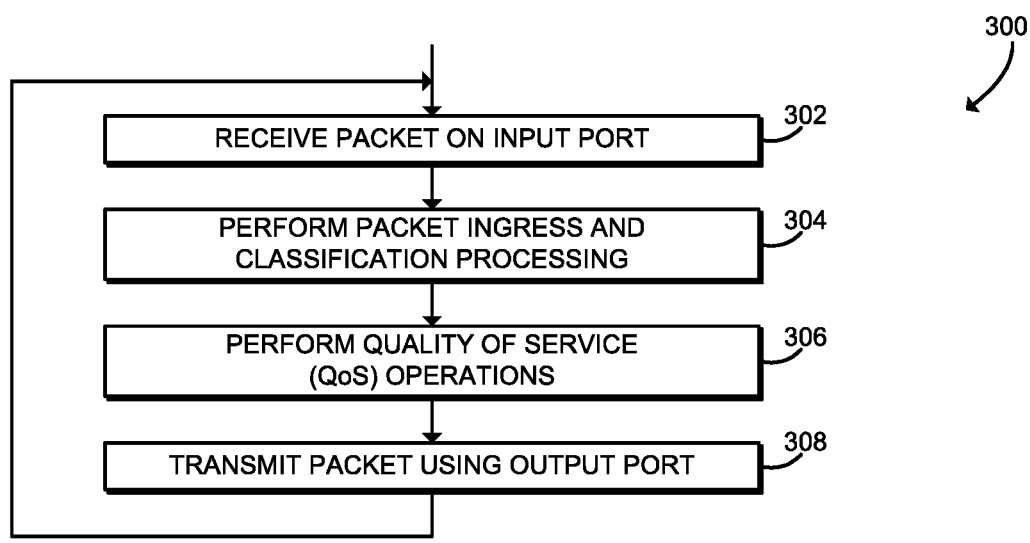
FIG. 3 is a schematic diagram of at least one embodiment of a method for network packet processing that may be executed by the computing device of FIGS. 1-2.

Referring now to FIG. 3, in use, the computing device 100 may execute a method 300 for network packet processing. It should be appreciated that, in some embodiments, the operations of the method 300 may be performed by one or more components of the environment 200 of the computing device 100 as shown in FIG. 2. The method 300 begins in block 302, in which the computing device 100 receives a network packet on an input port. The network packet may be embodied as an IP network packet, an Ethernet frame, a data link layer packet, or any other network packet received from a remote device (e.g., another computing device 100) using the communication subsystem 128.

In block 304, the computing device 100 performs packet ingress and classification processing. In particular, the computing device 100 may add the packet to the shared, lockless input ring 204 and then perform traffic class separation. During traffic class separation, one or more headers of the packet may be parsed to identify the traffic class of the packet (e.g., service type, virtual LAN, or other traffic class), the output port, the logical group, and/or other attributes of the network packet. The network packet is added to a traffic class ring 208 that is associated with the particular traffic class, output port, and/or other attributes of the packet. An active flow for the network packet may also be added to an active flow list 210, and the flow may be associated with a QoS resource 214. One potential embodiment of a method for packet ingress and classification processing is described below in connection with FIG. 4.

In block 306, the computing device 100 performs one or more quality of service (QoS) operations on the received network packet. In particular, the computing device 100 may allocate bandwidth to network packets that are active during a current scheduling quantum. The computing device 100 may prioritize allocated bandwidth to packets in higher-priority traffic class rings 208, and any unused bandwidth may be allocated to packets in lower-priority traffic class rings 208. After allocating bandwidth, the computing device 100 marks packets as scheduled for transmission or dropped. One potential embodiment of a method for QoS processing and output scheduling is described below in connection with FIG. 5.

In block 308, the computing device 100 transmits network packets that were marked for transmission using the appropriate output port. The computing device 100 may transmit the packets directly from the input ring 204 or, in some embodiments, may add the packets for transmission to one or more transmit queues 218 associated with the output port. After transmitting the network packets, the method 300 loops back to block 302 to continue processing input packets.

Although illustrated in FIG. 3 as receiving and classifying packets, performing QoS operations, and scheduling packets for transmission in sequential order, it should be understood that in some embodiments those operations may be performed concurrently or otherwise in parallel. For example, while performing the QoS operations and output scheduling of blocks 306, 308, in some embodiments the computing device 100 may perform the operations of blocks 302, 304 to receive and classify additional network packets in parallel. As another example, the QoS and output scheduling operations of blocks 306, 308 may be performed in parallel for each output port, logical group, or other group of traffic class rings 208. Because the input ring 204 and the traffic class rings 208 are embodied as lockless, shared rings, the computing device 100 may process multiple data packets in parallel without locking, thus allowing the computing device 100 to scale without experiencing excessive synchronization overhead.

Figure 4:
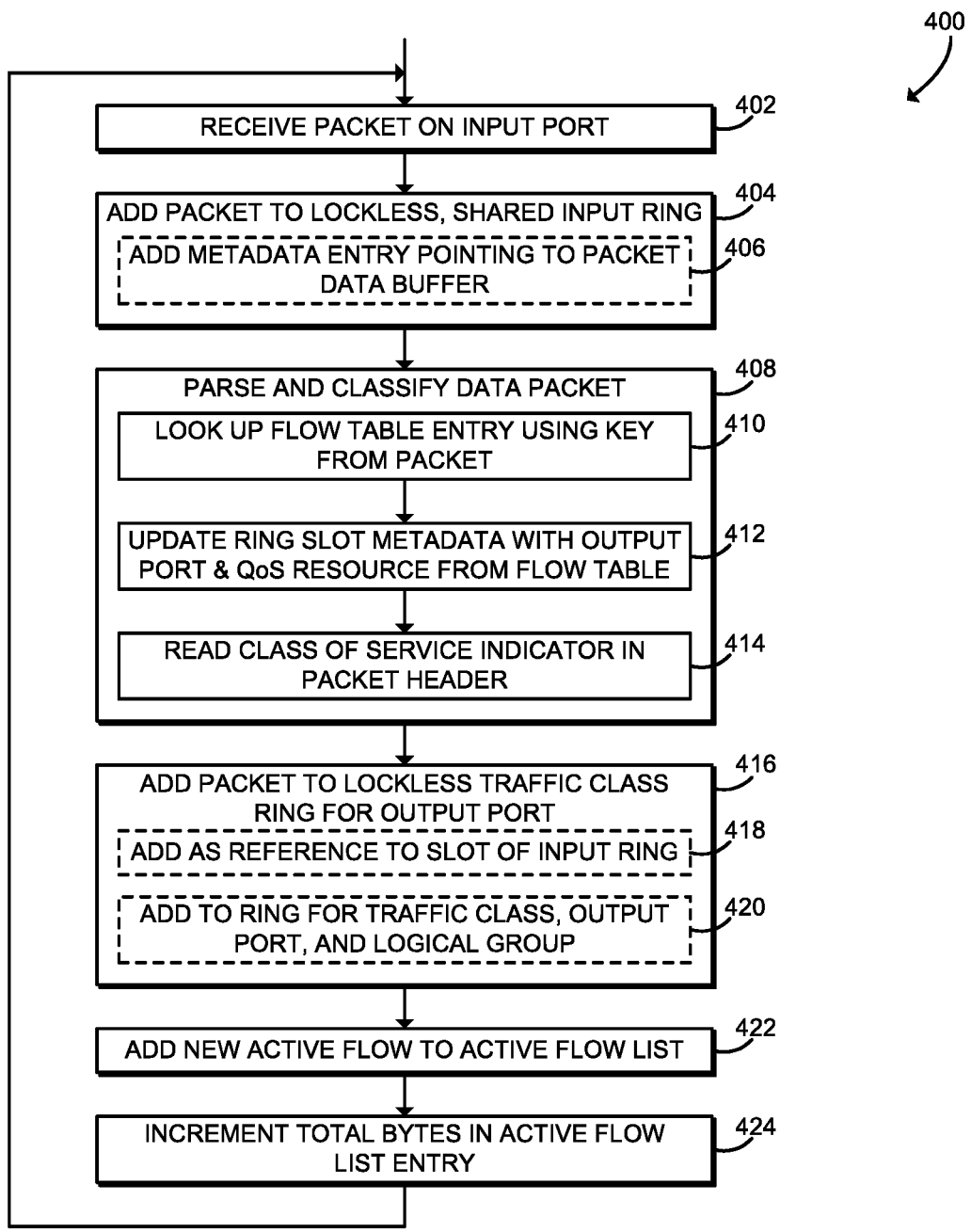
FIG. 4 is a schematic diagram of at least one embodiment of a method for packet ingress and flow classification that may be executed by the computing device of FIGS. 1-2.

Referring now to FIG. 4, in use, the computing device 100 may execute a method 400 for packet ingress and flow classification. It should be appreciated that, in some embodiments, the operations of the method 400 may be performed by one or more components of the environment 200 of the computing device 100 as shown in FIG. 2. As described above in connection with FIG. 3, the method 400 may be executed in connection with block 304 of FIG. 3, and thus may be executed in parallel with QoS and output scheduling operations. The method 400 begins in block 402, in which the computing device 100 receives a network packet on an input port. As described above, the network packet may be embodied as an IP network packet, an Ethernet frame, a data link layer packet, or any other network packet received from a remote device (e.g., another computing device 100) using the communication subsystem 128.

In block 404, the computing device 100 adds the packet to the lockless, shared input ring 204. The input ring 204 may be embodied as a ring buffer or other memory buffer established by the computing device 100 in the memory 124 and/or other memory resources of the computing device 100. The input ring 204 includes multiple ring slots that each include data and/or metadata relating to a particular network packet. For example, the ring slot metadata may include fields or other data structures to hold QoS resource information (e.g., a pointer to a QoS resource 214), a packet color (used for congestion management), a policed status, a scheduled status, a drop indication, a transmit flag, and/or an output port number. In some embodiments, in block 406 the computing device 100 may add a ring slot metadata entry to the input ring 204 that points to a data buffer in memory that includes the network packet data.

In block 408, the computing device 100 parses and classifies the data packet. The computing device 100 may perform any flow classification or other processing on the data packet, for example by examining one or more headers of the packet. In block 410, the computing device 100 looks up a flow table entry using a key from the packet. For example, the computing device 100 may identify a source address and destination address pair in the network packet and index one or more flow tables to find an associated flow table entry. In block 412, the computing device 100 updates ring slot metadata for the data packet with the output port and QoS resource 214 identified in the flow table entry. The QoS resource 214 may be used to track the current per-subscriber bandwidth allocated as a part of scheduling, as described further below in connection with FIG. 5. Additionally, in some embodiments subscribers may be grouped into logical interfaces and those logical interfaces may be scheduled relative to each other. In block 414, the computing device 100 reads a class of service indicator in a packet header of the data packet. The class of service indicator may indicate, for example, the application type (e.g., VoLTE), the packet priority, the VLAN, or other type of packet.

After classifying the data packet, in block 416 the computing device 100 adds the data packet to a lockless, shared traffic class ring 208 that is associated with the identified traffic class and output port. Similar to the input ring 204, each traffic class ring 208 may be embodied as a ring buffer or other memory buffer established by the computing device 100. Each traffic class ring 208 includes multiple ring slots that each include data and/or metadata relating to a particular network packet. In some embodiments, in block 418 the computing device 100 may add the data packet to the traffic class ring 208 as a reference to an associated slot of the input ring 204. Thus, in those embodiments any packet data and/or metadata included in the input ring 204 is not copied to the traffic class ring 208. Instead, the computing device 100 may process the ring slot metadata in-place, in the input ring 204. In some embodiments, in block 420 the computing device 100 may add the data packet to a traffic class ring 208 that is associated with a particular traffic class, output port, and logical group. The logical group may be embodied as a grouping of network traffic, services, or other network data. For example, a logical group may be associated with each subscriber in a multi-tenant data center.

In block 422, the computing device 100 may add a new active flow for the data packet to an active flow list 210. The active flow list 210 may be associated with the traffic class ring 208 that includes the data packet and may be used, for example, for bandwidth allocation or other QoS operations as described further below. The active flow list entry may include a timestamp, sequence number, or other information to identify data flows that are active during a particular scheduling quantum. In block 424, the computing device 100 increments the total bytes in the active flow list entry associated with the data packet. The active flow list entry may be incremented by the total size of the data packet, for example. As described below, the total bytes in the active flow list entry may be used for bandwidth allocation or other QoS operations. After incrementing the total bytes, the method 400 loops back to block 402 to continue receiving input packets.

Although illustrated in FIG. 4 as executing a single traffic class separation method 400, it should be understood that in some embodiments the computing device 100 may execute multiple traffic class separators in parallel. For example, in some embodiments the traffic class separator may be subdivided into two separators, one for high-priority traffic classes and the other for lower-priority traffic classes.

Additionally or alternatively, in some embodiments the active flow list 210 may be extended to contain an ordered list of each slot entry in the input ring 204 and/or the traffic class ring 208 associated with each specific flow. Each slot entry may be added as part of the traffic separation process. The list of slots in the active flow list 210 may be used as part of the later bandwidth allocation process. Once bandwidth is assigned to each active flow list 210, the bandwidth allocation process uses the list of entries in the active flow list entry to schedule or drop packets based on the allowed bandwidth, by walking through the list of slot entries associated with each flow.

Figure 5:
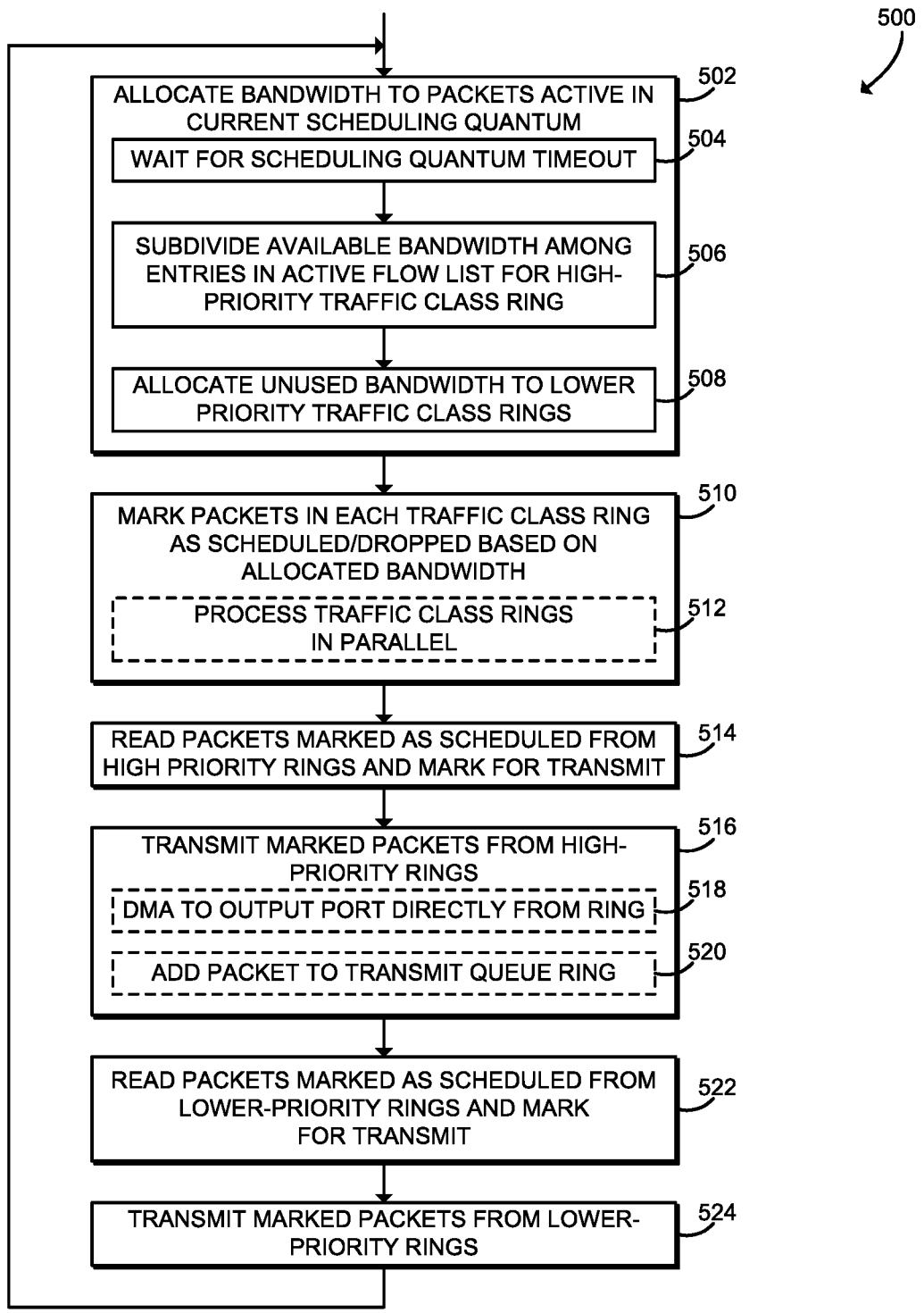
FIG. 5 is a simplified flow diagram of at least one embodiment of a method for quality of service processing and output scheduling that may be executed by the computing device of FIGS. 1-2.

Referring now to FIG. 5, in use, the computing device 100 may execute a method 500 for QoS processing and output scheduling. It should be appreciated that, in some embodiments, the operations of the method 500 may be performed by one or more components of the environment 200 of the computing device 100 as shown in FIG. 2. As described above in connection with FIG. 3, the method 500 may be executed in connection with block 306 of FIG. 3, and thus may be executed in parallel with packet ingress and traffic class separation operations. The method 500 begins in block 502, in which the computing device 100 allocates bandwidth to data packets that are active in the current scheduling quantum. In particular, the computing device 100 may allocate bandwidth among data packets stored in traffic class rings 208 associated with the same output port and/or associated with the same logical group. The computing device 100 may use any appropriate bandwidth allocation algorithm, and in particular may prioritize allocating bandwidth to data packets stored in higher-priority traffic class rings 208.

In some embodiments, in block 504 the computing device 100 may wait for the expiration of a scheduling quantum timeout. The computing device 100 divides the total outgoing bandwidth into allocations assigned to small subdivisions of time, called scheduling quanta. Each scheduling quantum may be any appropriate length of time, for example 100 microseconds. In that example, 10 Gb/s of outgoing bandwidth results in (10 Gbp/s)×(100 μs)=1,000,000 bits to be allocated, scheduled, and transmitted every 100 microseconds.

In block 506, the computing device 100 subdivides the available bandwidth among entries in the active flow list for a high-priority traffic class ring 208. Bandwidth may be allocated to each QoS resource 214 associated with an active flow. As described above, every ring slot metadata entry for each data packet may include a pointer to the QoS resource 214 associated with the flow. The computing device 100 may allocate bandwidth by determining the total number of transmission tokens available for the current scheduling quantum (e.g., one token per bit, byte, or other unit of data) and then allocating the tokens to the active flows in the high-priority traffic class rings 208 first, by assigning the tokens to the associated QoS resources 214. The computing device 100 may then read each packet in the traffic class rings 208, follow the pointer to the associated QoS resource 214, and then subtract the packet length from the tokens in the QoS resource 214. As described further below, if enough tokens exist in the QoS resource 214, the data packet may be marked as scheduled, and if there are not enough tokens, the data packet may be marked as dropped. In block 508, the computing device 100 may allocate unused bandwidth to data packets in lower-priority traffic class rings 208. The computing device 100 may use a similar scheduling algorithm to allocate bandwidth among data packets in the lower-priority traffic class rings 208. In some embodiments, bandwidth unused by a group or a logical interface may be made available to other interfaces, either fairly or using a priority scheme.

After allocating bandwidth, in block 510 the computing device 100 marks packets in each traffic class ring 208 as scheduled or dropped based on the allocated bandwidth. For example, if no bandwidth was allocated to a particular data packet, that data packet may be marked as dropped. The computing device 100 may mark the packets by updating appropriate fields in the ring slot metadata associated with the data packet. For example, the computing device 100 may update a scheduled status field and/or a drop indication in the ring slot metadata as appropriate. The ring slot metadata may be stored in the associated traffic class ring 208 and/or in the input ring 204. In some embodiments, in block 512, the computing device 100 may process the traffic class rings 208 in parallel. For example, an independent processor core, thread of execution, or other consumer may process each traffic class ring 208. Because each consumer updates particular metadata fields associated with each data packet in the traffic class ring 208 and/or the input ring 204, there is no need for locking or other synchronization techniques.

In block 514, the computing device 100 reads data packets marked as scheduled from one or more high-priority traffic class rings 208 and then marks those data packets for transmission. The computing device 100 may mark the packets for transmission by updating an appropriate field in the ring slot metadata associated with the data packet. For example, the computing device 100 may update a transmit flag in the ring slot metadata. The ring slot metadata may be stored in the associated traffic class ring 208 and/or in the input ring 204, as described above.

In block 516, the computing device 100 transmits packets marked for transmission from the one or more high-priority traffic class rings 208. Transmission may be shared between high-priority traffic class rings 208 of multiple groups of users using round robin, weighted round robin, or any other sharing method. The computing device 100 may use any technique for transmitting the data packets using the appropriate output port. In some embodiments, in block 518 the computing device 100 may transmit the data packets using a direct memory access (DMA) operation to the data stored in the input ring 204 and/or the traffic class ring 208. In some embodiments, in block 520 the computing device 100 may add each data packet for transmission to a transmit queue 218 associated with the output port.

In block 522, the computing device 100 reads data packets marked as scheduled from the remaining lower-priority traffic class rings 208 and then marks those data packets for transmission. Transmission may be shared between lower-priority traffic class rings 208 of multiple groups of users using round robin, weighted round robin, or any other sharing method. The computing device 100 may mark the data packets for transmission as described above in connection with block 514. In block 524, the computing device 100 transmits packets marked for transmission from the remaining lower-priority traffic class rings 208. The computing device 100 may use any technique for transmitting the data packets, as described above in connection with block 516. It should be understood that the method 500 illustrates a strict priority system in which high-priority data packets are transmitted before lower-priority packets. Additionally or alternatively, in some embodiments the computing device 100 may transmit data from higher- and lower-priority traffic class rings 208 using different schemes. After transmitting the data packets, the method 500 loops back to block 502 to continue allocating bandwidth for subsequent scheduling quanta.

It should be understood that in some embodiments the illustrative method 500 may be extended to support traffic shaping in addition to traffic bandwidth allocation and traffic scheduling. The traffic shaping process may be inserted between the traffic scheduling and transmit stages. Traffic shaping may add N additional timeslots/quanta for assigning shaped traffic for transmission. The traffic shaper may maintain a separate active flow list 210 for each shaping quantum. For each quantum, the traffic shaper may use a token bucket to track and assign traffic for transmission for each shaping time slot. When a packet is assigned for transmission, the shaper may set the transmit flag. The transmit process may be the same process as described above.

Figure 6:
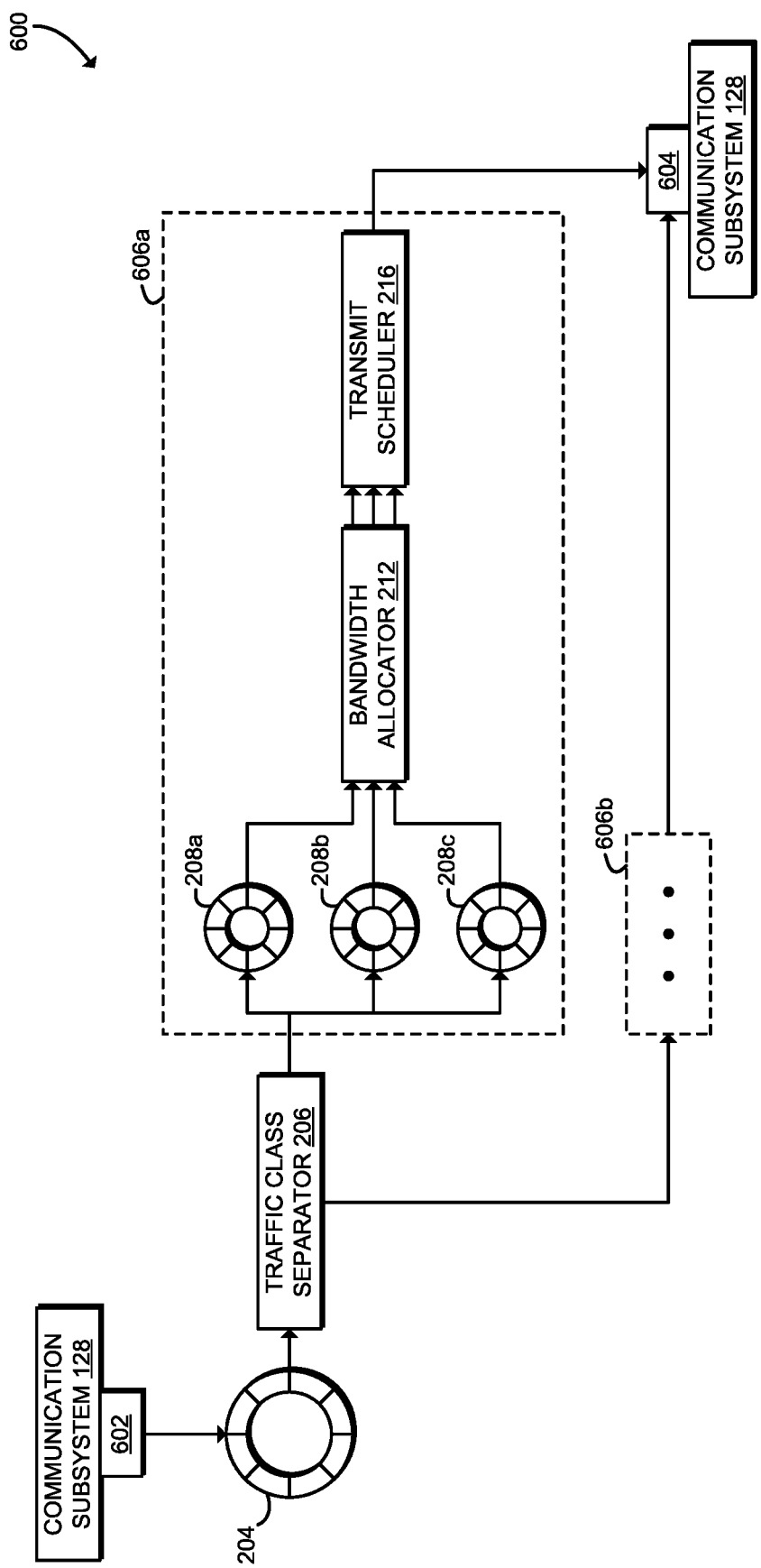
FIG. 6 is a schematic diagram illustrating at least one embodiment of the method for network packet processing that may be performed by the computing device of FIGS. 1-2.

Referring now to FIG. 6, schematic diagram 600 illustrates one potential embodiment of a method for network packet processing that may be executed by the computing device 100. As shown, data packets received from an input port 602 of the communication subsystem 128 are added to the input ring 204. The traffic class separator 206 processes the data packets and adds the packets to the appropriate traffic class rings 208. The diagram 600 illustratively shows three traffic class rings 208a, 208b, 208c. For example, the traffic class ring 208a may include high-priority data packets and the traffic class rings 208b, 208c may include lower-priority data packets. After being added to the traffic class rings 208, the bandwidth allocator 212 allocates bandwidth among the data packets. The bandwidth allocator 212 may, for example, allocate bandwidth among the high-priority data packets of traffic class ring 208a and then allocate unused bandwidth to lower-priority data packets the traffic class rings 208b, 208c. After bandwidth allocation, the transmit scheduler 216 marks the data packets for transmission and transmits the data packets using an appropriate output port 604 of the communication subsystem 128. As described above, the transmit scheduler 216 may transmit high-priority data packets from the traffic class ring 208a before transmitting the lower-priority data packets from the traffic class rings 208b, 208c. As described above, the rings 204, 208 are lockless, meaning that the traffic class separator 206 may execute concurrently with the bandwidth allocator 212 and the transmit scheduler 216.

As shown in FIG. 6, the traffic class rings 208a, 208b, 208c may be included in a logical group 606a. The computing device 100 may also process network packets in other logical groups 606 (e.g., the illustrated logical group 606b).

Each logical group 606 may include its own set of traffic class rings 208. As described above, bandwidth may be allocated between the groups 606 using a round robin method or any other sharing method. Additionally, although the diagram 600 illustrates a single output port 604, it should be understood that one or more groups 606 of traffic class rings 208 may also be established for each additional output port 604 of the computing device 100.

Additionally or alternatively, in some embodiments the computing device 100 may use different QoS techniques. For example, in some embodiments, the bandwidth allocator 212 may be replaced by a bandwidth shaper and/or a bandwidth shaper may be inserted between the bandwidth allocator 212 and the transmit scheduler 216. In those embodiments, the bandwidth shaper may use the same logic as the bandwidth allocator 212, except that the bandwidth shaper buffers (i.e., stores) and queues excess packets above the allocated committed rates for later transmission.

Figure 7:
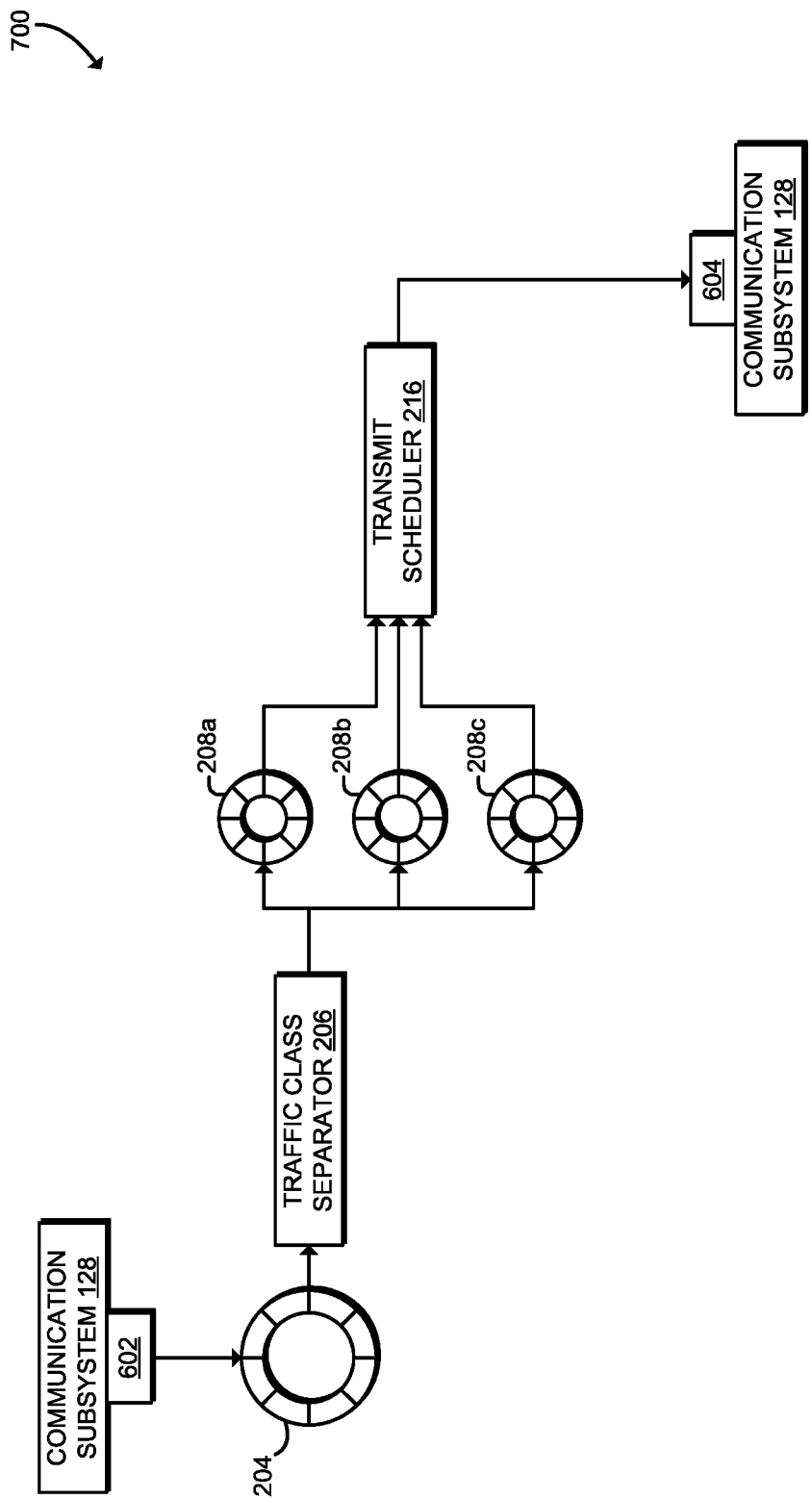
FIG. 7 is a schematic diagram illustrating another embodiment of the method for network packet processing that may be performed by the computing device of FIGS. 1-2.

Referring now to FIG. 7, schematic diagram 700 illustrates another potential embodiment of a method for network packet processing that may be executed by the computing device 100. As shown, data packets received from an input port 602 of the communication subsystem 128 are added to the input ring 204. The traffic class separator 206 processes the data packets and adds the packets to the appropriate traffic class rings 208a, 208b, 208c. After being added to the traffic class rings 208, the transmit scheduler 216 marks the data packets for transmission and transmits the data packets using an appropriate output port 604 of the communication subsystem 128. As described above, the transmit scheduler 216 may transmit high-priority data packets from the traffic class ring 208a before transmitting the lower-priority data packets from the traffic class rings 208b, 208c. Thus, the schematic diagram 700 illustrates a simple strict priority class-based QoS system that does not require bandwidth allocation.

It should be appreciated that, in some embodiments, the methods 300, 400, and/or 500 may be embodied as various instructions stored on a computer-readable media, which may be executed by the processor 120, the I/O subsystem 122, and/or other components of a computing device 100 to cause the computing device 100 to perform the respective method 300, 400, and/or 500. The computer-readable media may be embodied as any type of media capable of being read by the computing device 100 including, but not limited to, the memory 124, the data storage device 126, firmware devices, and/or other media.

EXAMPLES

Illustrative examples of the technologies disclosed herein are provided below. An embodiment of the technologies may include any one or more, and any combination of, the examples described below.

Example 1 includes a computing device for network packet processing, the computing device comprising: one or more processors; and one or more memory devices having stored therein a plurality of instructions that, when executed by the one or more processors, cause the computing device to: add incoming network packets to an input lockless shared ring, wherein to add the incoming network packets comprises to add ring slot metadata associated with the incoming network packets to the input lockless shared ring; add the incoming network packets to a plurality of lockless shared rings in response to adding of the incoming network packets to the input lockless shared ring, wherein each lockless shared ring is associated with an output port and a traffic class; schedule network packets in the plurality of lockless shared rings for transmission, wherein each of the network packets is included in a first scheduling quantum; and transmit the network packets in response to scheduling of the network packets for transmission.

Example 2 includes the subject matter of Example 1, and wherein to schedule the network packets comprises to schedule the network packets in parallel with addition of the incoming network packets to the input lockless shared ring and addition of the incoming network packets to the plurality of lockless shared rings.

Example 3 includes the subject matter of any of Examples 1 and 2, and wherein to schedule the network packets further comprises to schedule the network packets in a first lockless shared ring in parallel with scheduling of the network packets in a second lockless shared ring.

Example 4 includes the subject matter of any of Examples 1-3, and wherein: to add the incoming network packets to the input lockless shared ring comprises to add a first network packet to the input lockless shared ring, wherein the first network packet is associated with a first output port and a first traffic class; to add the incoming network packets to the plurality of lockless shared rings comprises to add the first network packet to a first lockless shared ring of the plurality of lockless shared rings, wherein the first lockless ring is associated with the first output port and the first traffic class; to schedule the network packets in the plurality of lockless shared rings comprises to schedule the first network packet in response to adding of the first network packet to the first lockless shared ring; and to transmit the network packets comprises to transmit the first network packet in response to scheduling of the first network packet.

Example 5 includes the subject matter of any of Examples 1-4, and wherein the ring slot metadata associated with the first network packet points to a data buffer that includes the first network packet.

Example 6 includes the subject matter of any of Examples 1-5, and wherein the ring slot metadata associated with the first network packet is indicative of the first output port.

Example 7 includes the subject matter of any of Examples 1-6, and wherein to add the first network packet to the first lockless shared ring comprises to add a reference to the ring slot metadata associated with the first network packet in the input lockless shared ring.

Example 8 includes the subject matter of any of Examples 1-7, and wherein the first lockless shared ring is further associated with a first logical group of a plurality of logical groups, and wherein each lockless shared ring is further associated with a logical group.

Example 9 includes the subject matter of any of Examples 1-8, and wherein the plurality of instructions, when executed, further cause the computing device to: allocate bandwidth to the network packets in the plurality of lockless shared rings; wherein to schedule the network packets in the plurality of lockless shared rings for transmission further comprises to schedule the network packets for transmission in response to allocation of the bandwidth to the network packets.

Example 10 includes the subject matter of any of Examples 1-9, and wherein: the ring slot metadata associated with each of the network packets in the plurality of lockless shared rings is indicative of a quality of service resource associated with the corresponding network packet; and to allocate the bandwidth to the network packets comprises to update the quality of service resource associated with each of the network packets.

Example 11 includes the subject matter of any of Examples 1-10, and wherein to allocate the bandwidth to the network packets in the plurality of lockless shared rings comprises to allocate bandwidth to network packets in a first logical group of lockless shared rings, wherein each lockless shared ring of the first logical group is associated with a first output port.

Example 12 includes the subject matter of any of Examples 1-11, and wherein to allocate the bandwidth to the network packets in the first logical group of lockless shared rings comprises to: subdivide the bandwidth among network packets in a first lockless shared ring of the first logical group, wherein the first lockless shared ring is associated with a high-priority traffic class; and allocate unused bandwidth among network packets in lockless shared rings of the first logical group associated with a lower-priority traffic class in response to subdivision of the bandwidth.

Example 13 includes the subject matter of any of Examples 1-12, and wherein to schedule the network packets in the plurality of lockless shared rings for transmission comprises to mark each of the network packets as scheduled or dropped in response to the allocation of the bandwidth to the network packets.

Example 14 includes the subject matter of any of Examples 1-13, and wherein to mark each of the network packets as scheduled or dropped comprises to update a scheduled status field or a dropped status field of the ring slot metadata associated with each of the network packets.

Example 15 includes the subject matter of any of Examples 1-14, and wherein to transmit the network packets comprises to: read a first set of network packets in the plurality of lockless shared rings, wherein each network packet in the first set of network packets is marked as scheduled; mark each network packet of the first set of network packets for transmission; and transmit each network packet of the first set of network packets with an output port of the computing device in response to a marking of each network packet of the first set of network packets for transmission.

Example 16 includes the subject matter of any of Examples 1-15, and wherein to mark each network packet of the first set of network packets for transmission comprises to update a transmit status field of the ring slot metadata associated with each network packet of the first set of network packets.

Example 17 includes the subject matter of any of Examples 1-16, and wherein to transmit the network packets comprises to: transmit network packets in a first lockless shared ring of a first logical group, wherein the first lockless shared ring is associated with a high-priority traffic class; and transmit network packets in lockless shared rings of the first logical group associated with a lower-priority traffic class in response to transmission of the network packets in the first lockless shared ring.

Example 18 includes a method for network packet processing, the method comprising: adding, by a computing device, incoming network packets to an input lockless shared ring, wherein adding the incoming network packets comprises adding ring slot metadata associated with the incoming network packets to the input lockless shared ring; adding, by the computing device, the incoming network packets to a plurality of lockless shared rings in response to adding the incoming network packets to the input lockless shared ring, wherein each lockless shared ring is associated with an output port and a traffic class; scheduling, by the computing device, network packets in the plurality of lockless shared rings for transmission, wherein each of the network packets is included in a first scheduling quantum; and transmitting, by the computing device, the network packets in response to scheduling the network packets for transmission.

Example 19 includes the subject matter of Example 18, and wherein scheduling the network packets comprises scheduling the network packets in parallel with adding the incoming network packets to the input lockless shared ring and adding the incoming network packets to the plurality of lockless shared rings.

Example 20 includes the subject matter of any of Examples 18 and 19, and wherein scheduling the network packets further comprises scheduling the network packets in a first lockless shared ring in parallel with scheduling the network packets in a second lockless shared ring.

Example 21 includes the subject matter of any of Examples 18-20, and wherein: adding the incoming network packets to the input lockless shared ring comprises adding a first network packet to the input lockless shared ring, wherein the first network packet is associated with a first output port and a first traffic class; adding the incoming network packets to the plurality of lockless shared rings comprises adding the first network packet to a first lockless shared ring of the plurality of lockless shared rings, wherein the first lockless ring is associated with the first output port and the first traffic class; scheduling the network packets in the plurality of lockless shared rings comprises scheduling the first network packet in response to adding the first network packet to the first lockless shared ring; and transmitting the network packets comprises transmitting the first network packet in response to scheduling the first network packet.

Example 22 includes the subject matter of any of Examples 18-21, and wherein the ring slot metadata associated with the first network packet points to a data buffer that includes the first network packet.

Example 23 includes the subject matter of any of Examples 18-22, and wherein the ring slot metadata associated with the first network packet is indicative of the first output port.

Example 24 includes the subject matter of any of Examples 18-23, and wherein adding the first network packet to the first lockless shared ring comprises adding a reference to the ring slot metadata associated with the first network packet in the input lockless shared ring.

Example 25 includes the subject matter of any of Examples 18-24, and wherein the first lockless shared ring is further associated with a first logical group of a plurality of logical groups, and wherein each lockless shared ring is further associated with a logical group.

Example 26 includes the subject matter of any of Examples 18-25, and further comprising: allocating, by the computing device, bandwidth to the network packets in the plurality of lockless shared rings; wherein scheduling the network packets in the plurality of lockless shared rings for transmission further comprises scheduling the network packets for transmission in response to allocating bandwidth to the network packets.

Example 27 includes the subject matter of any of Examples 18-26, and wherein: the ring slot metadata associated with each of the network packets in the plurality of lockless shared rings is indicative of a quality of service resource associated with the corresponding network packet; and allocating the bandwidth to the network packets comprises updating the quality of service resource associated with each of the network packets.

Example 28 includes the subject matter of any of Examples 18-27, and wherein allocating the bandwidth to the network packets in the plurality of lockless shared rings comprises allocating bandwidth to network packets in a first logical group of lockless shared rings, wherein each lockless shared ring of the first logical group is associated with a first output port.

Example 29 includes the subject matter of any of Examples 18-28, and wherein allocating the bandwidth to the network packets in the first logical group of lockless shared rings comprises: subdividing the bandwidth among network packets in a first lockless shared ring of the first logical group, wherein the first lockless shared ring is associated with a high-priority traffic class; and allocating unused bandwidth among network packets in lockless shared rings of the first logical group associated with a lower-priority traffic class in response to subdividing the bandwidth.

Example 30 includes the subject matter of any of Examples 18-29, and wherein scheduling the network packets in the plurality of lockless shared rings for transmission comprises marking each of the network packets as scheduled or dropped in response to allocating the bandwidth to the network packets.

Example 31 includes the subject matter of any of Examples 18-30, and wherein marking each of the network packets as scheduled or dropped comprises updating a scheduled status field or a dropped status field of the ring slot metadata associated with each of the network packets.

Example 32 includes the subject matter of any of Examples 18-31, and wherein transmitting the network packets comprises: reading a first set of network packets in the plurality of lockless shared rings, wherein each network packet in the first set of network packets is marked as scheduled; marking each network packet of the first set of network packets for transmission; and transmitting each network packet of the first set of network packets with an output port of the computing device in response to marking each network packet of the first set of network packets for transmission.

Example 33 includes the subject matter of any of Examples 18-32, and wherein marking each network packet of the first set of network packets for transmission comprises updating a transmit status field of the ring slot metadata associated with each network packet of the first set of network packets.

Example 34 includes the subject matter of any of Examples 18-33, and wherein transmitting the network packets comprises: transmitting network packets in a first lockless shared ring of a first logical group, wherein the first lockless shared ring is associated with a high-priority traffic class; and transmitting network packets in lockless shared rings of the first logical group associated with a lower-priority traffic class in response to transmitting the network packets in the first lockless shared ring.

Example 35 includes a computing device comprising: a processor; and a memory having stored therein a plurality of instructions that when executed by the processor cause the computing device to perform the method of any of Examples 18-34.

Example 36 includes one or more machine readable storage media comprising a plurality of instructions stored thereon that in response to being executed result in a computing device performing the method of any of Examples 18-34.

Example 37 includes a computing device comprising means for performing the method of any of Examples 18-34.

Example 38 includes a computing device for network packet processing, the computing device comprising: input stage circuitry to add incoming network packets to an input lockless shared ring, wherein to add the incoming network packets comprises to add ring slot metadata associated with the incoming network packets to the input lockless shared ring; traffic class separator circuitry to add the incoming network packets to a plurality of lockless shared rings in response to adding of the incoming network packets to the input lockless shared ring, wherein each lockless shared ring is associated with an output port and a traffic class; and transmit scheduler circuitry to (i) schedule network packets in the plurality of lockless shared rings for transmission, wherein each of the network packets is included in a first scheduling quantum, and (ii) transmit the network packets in response to scheduling of the network packets for transmission.

Example 39 includes the subject matter of Example 38, and wherein the transmit scheduler circuitry is to execute in parallel with the input stage circuitry and the traffic class separator circuitry.

Example 40 includes the subject matter of any of Examples 38 and 39, and wherein the transmit scheduler circuitry is further to schedule the network packets in a first lockless shared ring and in a second lockless shared ring in parallel.

Example 41 includes the subject matter of any of Examples 38-40, and wherein: to add the incoming network packets to the input lockless shared ring comprises to add a first network packet to the input lockless shared ring, wherein the first network packet is associated with a first output port and a first traffic class; to add the incoming network packets to the plurality of lockless shared rings comprises to add the first network packet to a first lockless shared ring of the plurality of lockless shared rings, wherein the first lockless ring is associated with the first output port and the first traffic class; to schedule the network packets in the plurality of lockless shared rings comprises to schedule the first network packet in response to adding of the first network packet to the first lockless shared ring; and to transmit the network packets comprises to transmit the first network packet in response to scheduling of the first network packet.

Example 42 includes the subject matter of any of Examples 38-41, and wherein the ring slot metadata associated with the first network packet points to a data buffer that includes the first network packet.

Example 43 includes the subject matter of any of Examples 38-42, and wherein the ring slot metadata associated with the first network packet is indicative of the first output port.

Example 44 includes the subject matter of any of Examples 38-43, and wherein to add the first network packet to the first lockless shared ring comprises to add a reference to the ring slot metadata associated with the first network packet in the input lockless shared ring.

Example 45 includes the subject matter of any of Examples 38-44, and wherein the first lockless shared ring is further associated with a first logical group of a plurality of logical groups, and wherein each lockless shared ring is further associated with a logical group.

Example 46 includes the subject matter of any of Examples 38-45, and further comprising: bandwidth allocator circuitry to allocate bandwidth to the network packets in the plurality of lockless shared rings; wherein to schedule the network packets in the plurality of lockless shared rings for transmission further comprises to schedule the network packets for transmission in response to allocation of the bandwidth to the network packets.

Example 47 includes the subject matter of any of Examples 38-46, and wherein: the ring slot metadata associated with each of the network packets in the plurality of lockless shared rings is indicative of a quality of service resource associated with the corresponding network packet; and to allocate the bandwidth to the network packets comprises to update the quality of service resource associated with each of the network packets.

Example 48 includes the subject matter of any of Examples 38-47, and wherein to allocate the bandwidth to the network packets in the plurality of lockless shared rings comprises to allocate bandwidth to network packets in a first logical group of lockless shared rings, wherein each lockless shared ring of the first logical group is associated with a first output port.

Example 49 includes the subject matter of any of Examples 38-48, and wherein to allocate the bandwidth to the network packets in the first logical group of lockless shared rings comprises to: subdivide the bandwidth among network packets in a first lockless shared ring of the first logical group, wherein the first lockless shared ring is associated with a high-priority traffic class; and allocate unused bandwidth among network packets in lockless shared rings of the first logical group associated with a lower-priority traffic class in response to subdivision of the bandwidth.

Example 50 includes the subject matter of any of Examples 38-49, and wherein to schedule the network packets in the plurality of lockless shared rings for transmission comprises to mark each of the network packets as scheduled or dropped in response to the allocation of the bandwidth to the network packets.

Example 51 includes the subject matter of any of Examples 38-50, and wherein to mark each of the network packets as scheduled or dropped comprises to update a scheduled status field or a dropped status field of the ring slot metadata associated with each of the network packets.

Example 52 includes the subject matter of any of Examples 38-51, and wherein to transmit the network packets comprises to: read a first set of network packets in the plurality of lockless shared rings, wherein each network packet in the first set of network packets is marked as scheduled; mark each network packet of the first set of network packets for transmission; and transmit each network packet of the first set of network packets with an output port of the computing device in response to a marking of each network packet of the first set of network packets for transmission.

Example 53 includes the subject matter of any of Examples 38-52, and wherein to mark each network packet of the first set of network packets for transmission comprises to update a transmit status field of the ring slot metadata associated with each network packet of the first set of network packets.

Example 54 includes the subject matter of any of Examples 38-53, and wherein to transmit the network packets comprises to: transmit network packets in a first lockless shared ring of a first logical group, wherein the first lockless shared ring is associated with a high-priority traffic class; and transmit network packets in lockless shared rings of the first logical group associated with a lower-priority traffic class in response to transmission of the network packets in the first lockless shared ring.

Example 55 includes a computing device for network packet processing, the computing device comprising: means for adding incoming network packets to an input lockless shared ring, wherein adding the incoming network packets comprises adding ring slot metadata associated with the incoming network packets to the input lockless shared ring; means for adding the incoming network packets to a plurality of lockless shared rings in response to adding the incoming network packets to the input lockless shared ring, wherein each lockless shared ring is associated with an output port and a traffic class; means for scheduling network packets in the plurality of lockless shared rings for transmission, wherein each of the network packets is included in a first scheduling quantum; and circuitry for transmitting the network packets in response to scheduling the network packets for transmission.

Example 56 includes the subject matter of Example 55, and wherein the means for scheduling the network packets comprises means for scheduling the network packets in parallel with adding the incoming network packets to the input lockless shared ring and adding the incoming network packets to the plurality of lockless shared rings.

Example 57 includes the subject matter of any of Examples 55 and 56, and wherein the means for scheduling the network packets further comprises means for scheduling the network packets in a first lockless shared ring in parallel with scheduling the network packets in a second lockless shared ring.

Example 58 includes the subject matter of any of Examples 55-57, and wherein: the means for adding the incoming network packets to the input lockless shared ring comprises means for adding a first network packet to the input lockless shared ring, wherein the first network packet is associated with a first output port and a first traffic class; the means for adding the incoming network packets to the plurality of lockless shared rings comprises means for adding the first network packet to a first lockless shared ring of the plurality of lockless shared rings, wherein the first lockless ring is associated with the first output port and the first traffic class; the means for scheduling the network packets in the plurality of lockless shared rings comprises means for scheduling the first network packet in response to adding the first network packet to the first lockless shared ring; and the circuitry for transmitting the network packets comprises circuitry for transmitting the first network packet in response to scheduling the first network packet.

Example 59 includes the subject matter of any of Examples 55-58, and wherein the ring slot metadata associated with the first network packet points to a data buffer that includes the first network packet.

Example 60 includes the subject matter of any of Examples 55-59, and wherein the ring slot metadata associated with the first network packet is indicative of the first output port.

Example 61 includes the subject matter of any of Examples 55-60, and wherein the means for adding the first network packet to the first lockless shared ring comprises means for adding a reference to the ring slot metadata associated with the first network packet in the input lockless shared ring.

Example 62 includes the subject matter of any of Examples 55-61, and wherein the first lockless shared ring is further associated with a first logical group of a plurality of logical groups, and wherein each lockless shared ring is further associated with a logical group.

Example 63 includes the subject matter of any of Examples 55-62, and further comprising: means for allocating bandwidth to the network packets in the plurality of lockless shared rings; wherein the means for scheduling the network packets in the plurality of lockless shared rings for transmission further comprises means for scheduling the network packets for transmission in response to allocating bandwidth to the network packets.

Example 64 includes the subject matter of any of Examples 55-63, and wherein: the ring slot metadata associated with each of the network packets in the plurality of lockless shared rings is indicative of a quality of service resource associated with the corresponding network packet; and the means for allocating the bandwidth to the network packets comprises means for updating the quality of service resource associated with each of the network packets.

Example 65 includes the subject matter of any of Examples 55-64, and wherein the means for allocating the bandwidth to the network packets in the plurality of lockless shared rings comprises means for allocating bandwidth to network packets in a first logical group of lockless shared rings, wherein each lockless shared ring of the first logical group is associated with a first output port.

Example 66 includes the subject matter of any of Examples 55-65, and wherein the means for allocating the bandwidth to the network packets in the first logical group of lockless shared rings comprises: means for subdividing the bandwidth among network packets in a first lockless shared ring of the first logical group, wherein the first lockless shared ring is associated with a high-priority traffic class; and means for allocating unused bandwidth among network packets in lockless shared rings of the first logical group associated with a lower-priority traffic class in response to subdividing the bandwidth.

Example 67 includes the subject matter of any of Examples 55-66, and wherein the means for scheduling the network packets in the plurality of lockless shared rings for transmission comprises means for marking each of the network packets as scheduled or dropped in response to allocating the bandwidth to the network packets.

Example 68 includes the subject matter of any of Examples 55-67, and wherein the means for marking each of the network packets as scheduled or dropped comprises means for updating a scheduled status field or a dropped status field of the ring slot metadata associated with each of the network packets.

Example 69 includes the subject matter of any of Examples 55-68, and wherein the circuitry for transmitting the network packets comprises: circuitry for reading a first set of network packets in the plurality of lockless shared rings, wherein each network packet in the first set of network packets is marked as scheduled; means for marking each network packet of the first set of network packets for transmission; and circuitry for transmitting each network packet of the first set of network packets with an output port of the computing device in response to marking each network packet of the first set of network packets for transmission.

Example 70 includes the subject matter of any of Examples 55-69, and wherein the means for marking each network packet of the first set of network packets for transmission comprises means for updating a transmit status field of the ring slot metadata associated with each network packet of the first set of network packets.

Example 71 includes the subject matter of any of Examples 55-70, and wherein the circuitry for transmitting the network packets comprises: circuitry for transmitting network packets in a first lockless shared ring of a first logical group, wherein the first lockless shared ring is associated with a high-priority traffic class; and circuitry for transmitting network packets in lockless shared rings of the first logical group associated with a lower-priority traffic class in response to transmitting the network packets in the first lockless shared ring.

The invention claimed is:

1. A computing device for network packet processing, the computing device comprising:
one or more processors; and
one or more memory devices having stored therein a plurality of instructions that, when executed by the one or more processors, cause the computing device to:
add incoming network packets to an input lockless shared ring, wherein to add the incoming network packets comprises to add ring slot metadata associated with the incoming network packets to the input lockless shared ring;
add the incoming network packets to a plurality of lockless shared rings in response to adding of the incoming network packets to the input lockless shared ring, wherein each lockless shared ring is associated with an output port and a traffic class;
schedule network packets in the plurality of lockless shared rings for transmission, wherein each of the network packets is included in a first scheduling quantum; and
transmit the network packets in response to scheduling of the network packets for transmission.

2. The computing device of claim 1, wherein to schedule the network packets comprises to schedule the network packets in parallel with addition of the incoming network packets to the input lockless shared ring and addition of the incoming network packets to the plurality of lockless shared rings.

3. The computing device of claim 2, wherein to schedule the network packets further comprises to schedule the network packets in a first lockless shared ring in parallel with scheduling of the network packets in a second lockless shared ring.

4. The computing device of claim 1, wherein:
to add the incoming network packets to the input lockless shared ring comprises to add a first network packet to the input lockless shared ring, wherein the first network packet is associated with a first output port and a first traffic class;
to add the incoming network packets to the plurality of lockless shared rings comprises to add the first network packet to a first lockless shared ring of the plurality of lockless shared rings, wherein the first lockless ring is associated with the first output port and the first traffic class;
to schedule the network packets in the plurality of lockless shared rings comprises to schedule the first network packet in response to adding of the first network packet to the first lockless shared ring; and
to transmit the network packets comprises to transmit the first network packet in response to scheduling of the first network packet.

5. The computing device of claim 4, wherein to add the first network packet to the first lockless shared ring comprises to add a reference to the ring slot metadata associated with the first network packet in the input lockless shared ring.

6. The computing device of claim 4, wherein the first lockless shared ring is further associated with a first logical group of a plurality of logical groups, and wherein each lockless shared ring is further associated with a logical group.

7. The computing device of claim 1, wherein the plurality of instructions, when executed, further cause the computing device to:
allocate bandwidth to the network packets in the plurality of lockless shared rings;
wherein to schedule the network packets in the plurality of lockless shared rings for transmission further comprises to schedule the network packets for transmission in response to allocation of the bandwidth to the network packets.

8. The computing device of claim 7, wherein:
the ring slot metadata associated with each of the network packets in the plurality of lockless shared rings is indicative of a quality of service resource associated with a corresponding network packet; and
to allocate the bandwidth to the network packets comprises to update the quality of service resource associated with each of the network packets.

9. The computing device of claim 7, wherein to allocate the bandwidth to the network packets in the plurality of lockless shared rings comprises to allocate bandwidth to network packets in a first logical group of lockless shared rings, wherein each lockless shared ring of the first logical group is associated with a first output port.

10. The computing device of claim 9, wherein to allocate the bandwidth to the network packets in the first logical group of lockless shared rings comprises to:
subdivide the bandwidth among network packets in a first lockless shared ring of the first logical group, wherein the first lockless shared ring is associated with a high-priority traffic class; and
allocate unused bandwidth among network packets in lockless shared rings of the first logical group associated with a lower-priority traffic class in response to subdivision of the bandwidth.

11. The computing device of claim 1, wherein to transmit the network packets comprises to:
transmit network packets in a first lockless shared ring of a first logical group, wherein the first lockless shared ring is associated with a high-priority traffic class; and
transmit network packets in lockless shared rings of the first logical group associated with a lower-priority traffic class in response to transmission of the network packets in the first lockless shared ring.

12. One or more non-transitory machine-readable storage media comprising a plurality of instructions stored thereon that, in response to being executed, cause a computing device to:
add incoming network packets to an input lockless shared ring, wherein adding the incoming network packets comprises adding ring slot metadata associated with the incoming network packets to the input lockless shared ring;
add the incoming network packets to a plurality of lockless shared rings in response to adding the incoming network packets to the input lockless shared ring, wherein each lockless shared ring is associated with an output port and a traffic class;
schedule network packets in the plurality of lockless shared rings for transmission, wherein each of the network packets is included in a first scheduling quantum; and
transmit the network packets in response to scheduling the network packets for transmission.

13. The one or more machine-readable storage media of claim 12, wherein to schedule the network packets comprises to schedule the network packets in parallel with adding the incoming network packets to the input lockless shared ring and adding the incoming network packets to the plurality of lockless shared rings.

14. The one or more machine-readable storage media of claim 13, wherein to schedule the network packets further comprises to schedule the network packets in a first lockless shared ring in parallel with scheduling the network packets in a second lockless shared ring.

15. The one or more machine-readable storage media of claim 12, wherein:
to add the incoming network packets to the input lockless shared ring comprises to add a first network packet to the input lockless shared ring, wherein the first network packet is associated with a first output port and a first traffic class;
to add the incoming network packets to the plurality of lockless shared rings comprises to add the first network packet to a first lockless shared ring of the plurality of lockless shared rings, wherein the first lockless ring is associated with the first output port and the first traffic class;
to schedule the network packets in the plurality of lockless shared rings comprises to schedule the first network packet in response to adding the first network packet to the first lockless shared ring; and
to transmit the network packets comprises to transmit the first network packet in response to scheduling the first network packet.

16. The one or more machine-readable storage media of claim 15, wherein to add the first network packet to the first lockless shared ring comprises to add a reference to the ring slot metadata associated with the first network packet in the input lockless shared ring.

17. The one or more machine-readable storage media of claim 15, wherein the first lockless shared ring is further associated with a first logical group of a plurality of logical groups, and wherein each lockless shared ring is further associated with a logical group.

18. The one or more machine-readable storage media of claim 12, wherein the plurality of instructions, when executed, further cause the computing device to:
allocate bandwidth to the network packets in the plurality of lockless shared rings;
wherein to schedule the network packets in the plurality of lockless shared rings for transmission further comprises to schedule the network packets for transmission in response to allocating bandwidth to the network packets.

19. The one or more machine-readable storage media of claim 18, wherein:
the ring slot metadata associated with each of the network packets in the plurality of lockless shared rings is indicative of a quality of service resource associated with a corresponding network packet; and
to allocate the bandwidth to the network packets comprises to update the quality of service resource associated with each of the network packets.

20. The one or more machine-readable storage media of claim 18, wherein to allocate the bandwidth to the network packets in the plurality of lockless shared rings comprises to allocate bandwidth to network packets in a first logical group of lockless shared rings, wherein each lockless shared ring of the first logical group is associated with a first output port.

21. The one or more machine-readable storage media of claim 20, wherein to allocate the bandwidth to the network packets in the first logical group of lockless shared rings comprises to:
  subdivide the bandwidth among network packets in a first lockless shared ring of the first logical group, wherein the first lockless shared ring is associated with a high-priority traffic class; and
  allocate unused bandwidth among network packets in lockless shared rings of the first logical group associated with a lower-priority traffic class in response to subdividing the bandwidth.

22. The one or more machine-readable storage media of claim 12, wherein to transmit the network packets comprises to:
  transmit network packets in a first lockless shared ring of a first logical group, wherein the first lockless shared ring is associated with a high-priority traffic class; and
  transmit network packets in lockless shared rings of the first logical group associated with a lower-priority traffic class in response to transmitting the network packets in the first lockless shared ring.

23. A computing device for network packet processing, the computing device comprising:
  means for adding incoming network packets to an input lockless shared ring, wherein adding the incoming network packets comprises adding ring slot metadata associated with the incoming network packets to the input lockless shared ring;
  means for adding the incoming network packets to a plurality of lockless shared rings in response to adding the incoming network packets to the input lockless shared ring, wherein each lockless shared ring is associated with an output port and a traffic class;
  means for scheduling network packets in the plurality of lockless shared rings for transmission, wherein each of the network packets is included in a first scheduling quantum; and
  circuitry for transmitting the network packets in response to scheduling the network packets for transmission.

24. A method for network packet processing, the method comprising:
  adding, by a computing device, incoming network packets to an input lockless shared ring, wherein adding the incoming network packets comprises adding ring slot metadata associated with the incoming network packets to the input lockless shared ring;
  adding, by the computing device, the incoming network packets to a plurality of lockless shared rings in response to adding the incoming network packets to the input lockless shared ring, wherein each lockless shared ring is associated with an output port and a traffic class;
  scheduling, by the computing device, network packets in the plurality of lockless shared rings for transmission, wherein each of the network packets is included in a first scheduling quantum; and
  transmitting, by the computing device, the network packets in response to scheduling the network packets for transmission.

25. The method of claim 24, wherein scheduling the network packets comprises scheduling the network packets in parallel with adding the incoming network packets to the input lockless shared ring and adding the incoming network packets to the plurality of lockless shared rings.

26. The method of claim 24, wherein:
  adding the incoming network packets to the input lockless shared ring comprises adding a first network packet to the input lockless shared ring, wherein the first network packet is associated with a first output port and a first traffic class;
  adding the incoming network packets to the plurality of lockless shared rings comprises adding the first network packet to a first lockless shared ring of the plurality of lockless shared rings, wherein the first lockless shared ring is associated with the first output port and the first traffic class;
  scheduling the network packets in the plurality of lockless shared rings comprises scheduling the first network packet in response to adding the first network packet to the first lockless shared ring; and
  transmitting the network packets comprises transmitting the first network packet in response to scheduling the first network packet.

27. The method of claim 24, further comprising:
  allocating, by the computing device, bandwidth to the network packets in the plurality of lockless shared rings;
  wherein scheduling the network packets in the plurality of lockless shared rings for transmission further comprises scheduling the network packets for transmission in response to allocating bandwidth to the network packets.

28. The method of claim 24, wherein transmitting the network packets comprises:
  transmitting network packets in a first lockless shared ring of a first logical group, wherein the first lockless shared ring is associated with a high-priority traffic class; and
  transmitting network packets in lockless shared rings of the first logical group associated with a lower-priority traffic class in response to transmitting the network packets in the first lockless shared ring.

* * * * *